United States Patent Office 2,868,794
Patented Jan. 13, 1959

2,868,794
PROCESS OF PREPARING CYANOPYRIDYL-ALKANES

Francis E. Cislak, Indianapolis, Ind., assignor to Reilly Tar & Chemical Corporation, Indianapolis, Ind., a corporation of Indiana No Drawing. Application February 17, 1958
Serial No. 715,530

6 Claims. (Cl. 260—294.9)

This invention relates to a process of preparing cyanopyridylalkanes. More particularly it relates to cyanopyridylalkanes having the following formulae:

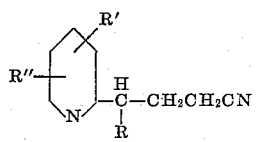

and

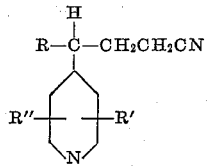

wherein R' and R'' are hydrogen or lower alkyl and R is hydrogen or the group —$(CH_2)_n CN$, where $n$ is a small integer from 1 to 4.

In general the compounds of my invention are made by the condensation of a 2-picoline or a 4-picoline with acrylonitrile, in the presence of an alkali metal catalyst.

Illustrative of the manner in which my invention may be practiced are the following examples.

EXAMPLE 1

3-(2-pyridyl)butyronitrile

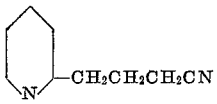

Into a flask equipped with a high speed stirrer and a reflux condenser there are placed 279 grams (3 moles) of 2-picoline and five grams of metallic sodium. The mixture is heated to from about 100° C. to 110° C., and it is stirred vigorously, thereby causing the sodium to become dispersed in the form of very fine particles. While continuing the stirring and heating, 106 grams (2 moles) of acrylonitrile are added dropwise. After all of the acrylonitrile has been added, the reaction mixture is heated under reflux conditions for about 3–5 hours. Then the reaction mixture is cooled to room temperature. To the cool reaction mixture there is added, slowly with stirring, about 50 cc. of methanol to "kill" the sodium. Then about 500 cc. of water is added. The mixture is extracted with three 500 cc. portions of chloroform. The chloroform extract is subjected to fractional distillation under vacuum. The chloroform is distilled off at atmospheric pressure. Then the distillation is continued under vacuum (1 mm.) to obtain fractions containing unreacted acrylonitrile and 2-picoline, then a fraction of the 3-(2-pyridyl)butyronitrile, which compound boils at about 95–97° C. at 1 mm. Continued distillation yields a small amount of 1,5-dicyano-3-(2-pyridyl)pentane, which was formed by the interaction of the 3-(2-pyridyl)butyronitrile with acrylonitrile.

EXAMPLE 2

1,5-dicyano-3-(2-pyridyl)pentane

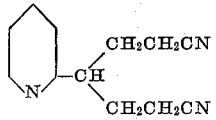

Into a flask equipped with a high speed stirrer and a reflux condenser there are placed 279 grams (3 moles) of 2-picoline and five grams of metallic sodium. The mixture is heated to about 100° to 110° C., and it is stirred vigorously thereby causing the sodium to become dispersed in the form of fine particles. While continuing the stirring and heating, 371 grams (7 moles) of acrylonitrile are added dropwise. After all of the acrylonitrile has been added, the reaction mixture is heated under reflux conditions for about 3–5 hours. Then the reaction mixture is cooled to room temperature. To the cool reaction mixture there is added, slowly with stirring, about 50 cc. of methanol to "kill" the sodium. Then about 500 cc. of water is added. The mixture is extracted with three 500 cc. portions of chloroform. The chloroform extract is subjected to fractional distillation. The chloroform is distilled off at atmospheric pressure. Then the distillation is continued under vacuum (about 1 mm.) to obtain fractions containing unreacted acrylonitrile and 2-picoline, some 3-(2-pyridyl)butyronitrile and then at a temperature above about 105° C. to 110° C. there is obtained 1,5-dicyano-3-(2-pyridyl)pentane.

EXAMPLE 3

1,5-dicyano-3-(4-pyridyl)pentane

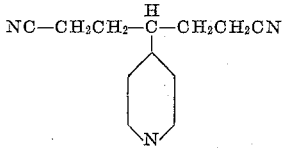

The process of Example 2 is repeated with the exception that 279 grams of 4-picoline are used in place of the 2-picoline and that during the fractional distillation the 1,5-dicyano-3-(4-pyridyl)pentane is obtained at a temperature above about 140° to 150° C.

EXAMPLE 4

3-(4-pyridyl)butyronitrile

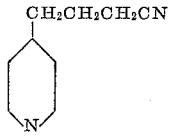

The process of Example 1 is repeated save that 279 grams of 4-picoline are used in place of the 2-picoline and obtained are 3-(4-pyridyl)butyronitrile and some 1,5-dicyano-3-(4-pyridyl)pentane. The 3-(4-pyridyl)butyronitrile boils at about 122–125° C. at 1 mm.

EXAMPLE 5

3-(2,5-ethylpyridyl)butyronitrile

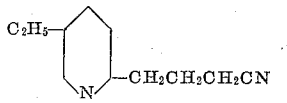

The process of Example 1 is repeated save that 400 grams of 2-methyl-5-ethylpyridine are used in place of the 279 grams of 2-picoline.

EXAMPLE 6

*1,4-dicyano-2-(2-pyridyl)butane*

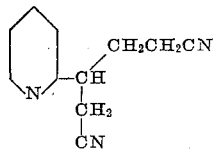

The procedure of Example 1 is repeated with the exception that in place of the 2-picoline, I use one mole of 2-(2-pyridyl)propionitrile.

For reasons of economy I prefer to use metallic sodium as the catalyst. I may, however, use other alkali metals such as, for example, potassium. Or I may use sodium or potassium amides. Or I may use alkali metal picolyls such as sodiopicolyls, lithium picolyls, or potassium picolyls. In short, I may use as the catalyst alkali metals and alkali metal compounds which are capable of forming alkali metal picolyls.

In place of the 2-picoline, the 4-picoline, and the 2-methyl-5-ethylpyridine, I may use other alkylpyridines containing a —CH₂ group in the 2-position or the 4-position. Among such other alkylpyridines which I find particularly useful are 2,3-lutidine, 4-ethylpyridine, 3,4-lutidine, 2,4-lutidine, 2,6-lutidine, 2,4,6-collidine, 2-benzylpyridine, 4-benzylpyridine, 2-p-chlorobenzylpyridine.

The cyanopyridylalkanes of my invention are useful in retarding the action of inorganic non-oxidizing acids upon steel. Some of them are important intermediates in the synthesis of organic compounds, for example, the 1,5-dicyano-3-(2-pyridyl)pentane upon hydrogenation gives 1,7-diamino-4-(2-pyridyl)heptane which is useful as a curing agent for epoxy resins.

I claim as my invention:

1. The process of preparing compounds of the class consisting of cyanopyridylalkanes having the following general formulae:

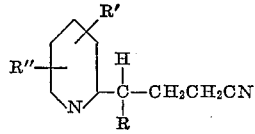

and

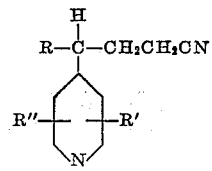

wherein R' and R'' are selected from the group consisting of hydrogen and lower alkyl and R is a member of the class consisting of hydrogen and the radical —$(CH_2)_nCN$ where $n$ is a small integer of from 1 to 4 which comprises heating, in the presence of an alkali metal catalyst, acrylonitrile and a picoline selected from the group of compounds having the formulae:

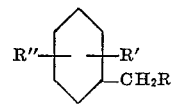

and

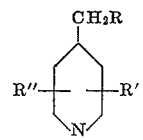

wherein R, R', and R'' have the same values as hereinbefore designated.

2. The process of claim 1 wherein the picoline is 2-picoline.

3. The process of claim 1 wherein the picoline is 4-picoline.

4. The process of claim 1 wherein the picoline is 2-(2-pyridyl)propionitrile.

5. The process of preparing 1,5-dicyano-3-(2-pyridyl)pentane which comprises heating at about 100° C. a mixture comprising a catalytic amount of metallic sodium, about one mole of 2-picoline and about two moles of acrylonitrile, and recovering 1,5-dicyano-3-(2-pyridyl)pentane from the reaction mixture.

6. The process of claim 5 wherein the picoline used is 4-picoline and 1,5-dicyano-3-(4-pyridyl)pentane is recovered from the reaction mixture.

No references cited.